J. DE MARTINO.
POWER TRANSMITTING MECHANISM.
APPLICATION FILED JUNE 17, 1916.

1,310,115.

Patented July 15, 1919.
4 SHEETS—SHEET 1.

Inventor
Joseph de Martino

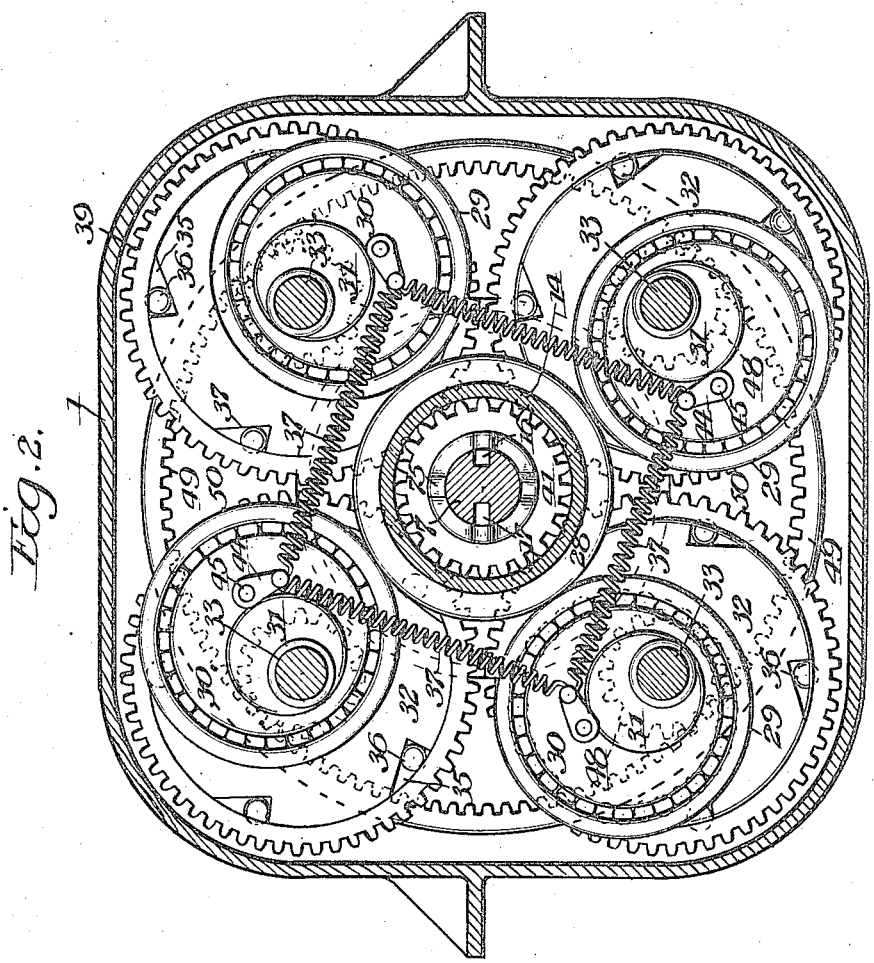

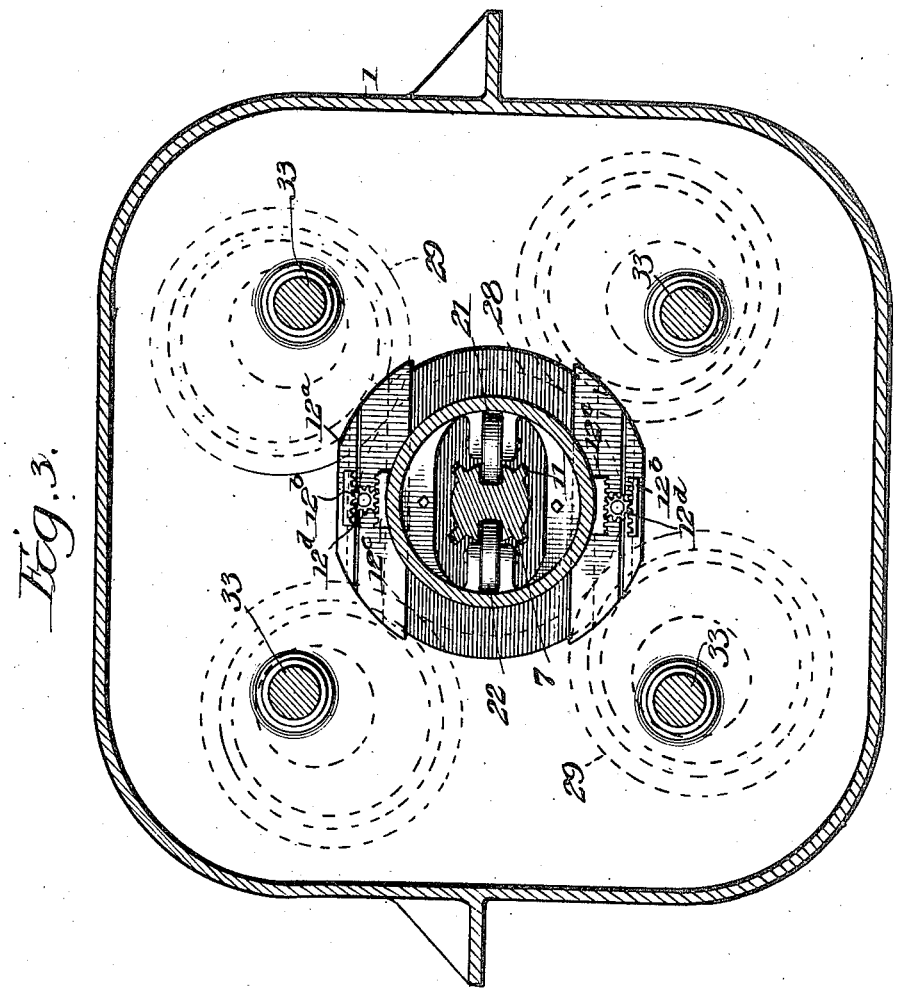

J. DE MARTINO.
POWER TRANSMITTING MECHANISM.
APPLICATION FILED JUNE 17, 1916.
1,310,115.
Patented July 15, 1919.
4 SHEETS—SHEET 4.
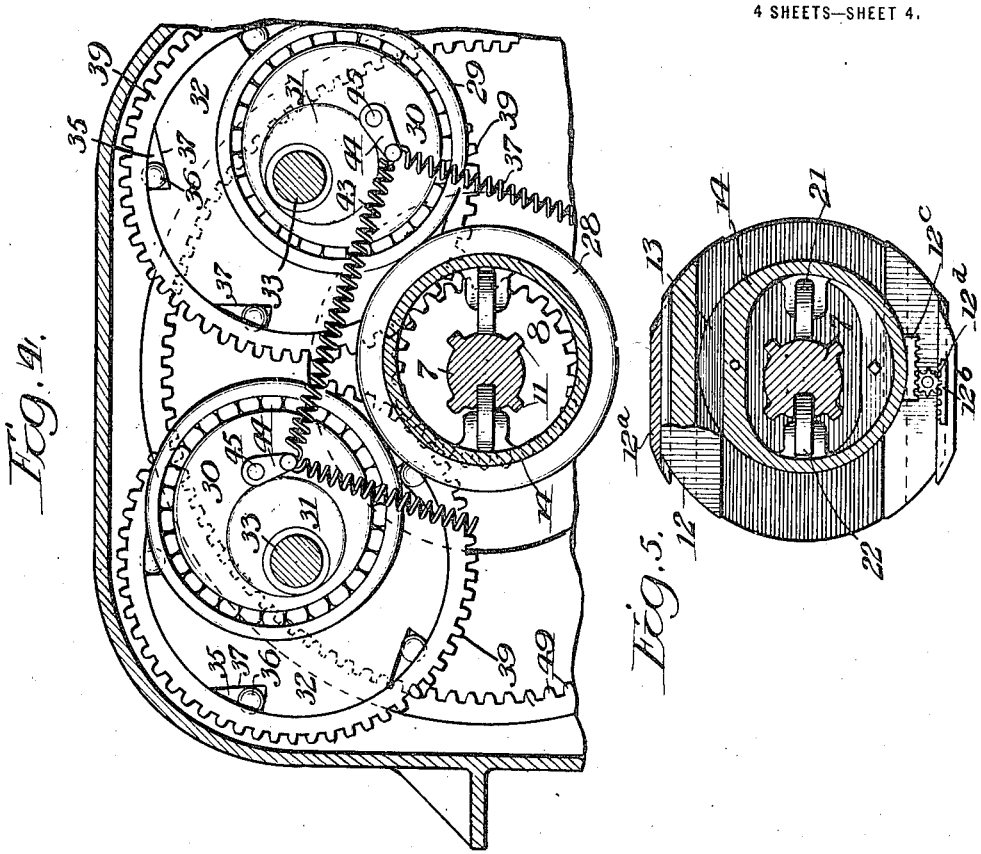
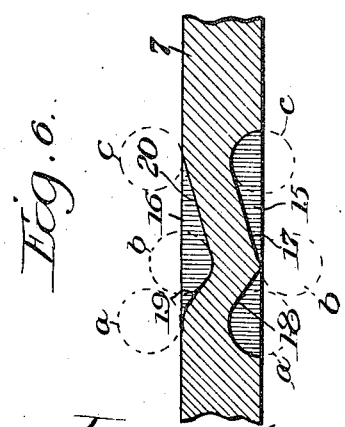
Inventor
Joseph de Martino
by A. Miller Belfield Atty.

UNITED STATES PATENT OFFICE.

JOSEPH DE MARTINO, OF CHICAGO, ILLINOIS, ASSIGNOR TO MECHANICAL IMPROVEMENT COMPANY, OF CHICAGO, ILLINOIS, A CORPORATION OF ILLINOIS.

POWER-TRANSMITTING MECHANISM.

1,310,115.   Specification of Letters Patent.   Patented July 15, 1919.

Application filed June 17, 1916. Serial No. 104,156.

*To all whom it may concern:*

Be it known that I, JOSEPH DE MARTINO, a subject of the King of Italy, residing at Chicago, in the county of Cook and State of Illinois, have invented a certain new and useful Improvement in Power-Transmitting Mechanism, of which the following is a full, clear, concise, and exact description, reference being had to the accompanying drawings, forming a part of this specification.

My invention relates to power transmitting mechanism, and especially to a type of transmission especially adapted for use in connection with explosive or like engines, as for example upon automobile, power boats, and the like.

Prominent objects of the invention are to provide a simple and practical power transmission; to avoid the necessity of using a plurality of levers in order to get different speeds; to permit the speed to be gradually increased from a minimum to a maximum by the use of a single lever, and to be gradually returned to a minimum or zero in the same way; to permit direct drive by the prime mover; to permit such direct drive to be brought about upon the attainment of maximum speed by the transmission; to permit the reverse transmission to be controlled by a single or the same operating element; and to accomplish the foregoing and other desirable results in a simple and expeditious manner.

In the accompanying drawings Figure 1 is a view in vertical section of a transmission embodying my present invention;

Fig. 2 is a cross section taken substantially through the center of the transmission at right angles to the central rotary shaft thereof;

Fig. 3 is a transverse section similar to Fig. 2, taken at one side of the latter;

Figs. 4, 5 and 6 are views of details of construction.

Figure 1:
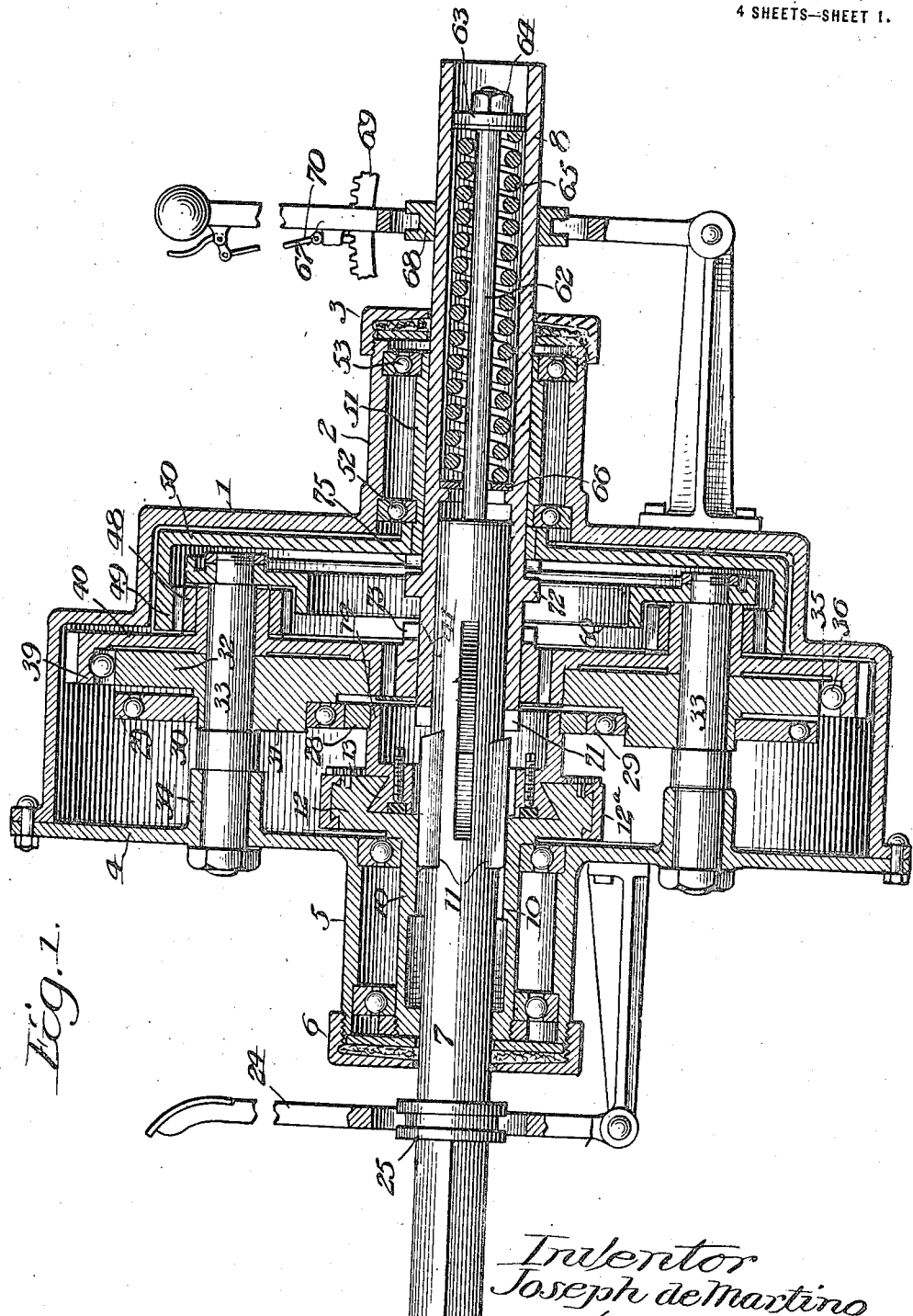

Referring to the drawings I show a casing 1 having a prolongation 2 closed by a stuffing box 3. The other side of the casing is closed by a plate 4 having a prolongation 5 provided with a stuffing box 6. The driving shaft 7 is understood to be connected with a gasolene engine or other prime mover and the driven shaft 8 with the driven element, such for example as the wheel axle or wheels or suitable shaft for driving the wheels of an automobile or the propeller of a motor boat. A sleeve 10 is keyed to the driving shaft 7 by means of keys 11, the shaft 7 being longitudinally adjustable within the sleeve 10, but rotating the latter because of the keys 11. The sleeve 10 is provided with an annular flange 12 having transverse dove tail shaped guideways in which projections 13 on a drum 14 fit and slide. This drum 14 is adapted to slide transversely to the shaft 7 and relatively to the sleeve 10, so that said drum 14 may come into positions more or less eccentric to the shaft 7, as well as concentric thereto. As an arrangement for effecting a transverse shifting movement of the drum 14 relatively to the shaft 7, the latter is provided with grooves 15 and 16 as best shown in Fig. 6, the inner surfaces of said grooves being formed by inclines 17, 18, 19 and 20; and the drum 14 is provided with wheels or rollers 21 and 22 adapted to slide in said grooves 15 and 16. By a longitudinal shifting movement on the part of the shaft 7, the wheels 21 and 22 by following the grooves 15 and 16 will cause a transverse shifting movement on the part of the drum 14 so as to vary the position of the drum 14 from concentricity to extreme eccentricity. For example, as shown in Fig. 6, when the rollers are in the dotted positions *a*, the drum 14 will be concentric with the shaft 7, but when the shaft 7 is shifted to the left so as to permit the rollers to come into the dotted positions *b*, the drum 14 will be in its most eccentric position. Further shifting movement of the shaft 7 to the left will cause the rollers to assume the dotted positions *c* in which positions the drum 14 is again concentric. This shifting movement on the part of the shaft 7 may be accomplished by a lever 24 engaging a collar 25 on the shaft 7. The drum 14 is provided with a wearing ring 28 which is adapted to come into contact with the exterior surfaces or edges of rings 29 forming the race rings of ball bearings on eccentric disks 30. These disks 30 are mounted upon eccentrics 31 formed upon disks 32 which are mounted upon shafts 33 supported by bearings 34 in the disk or plate 4. The disks 32 have their peripheries provided with recesses 35 containing balls 36, the recesses 35 having inclined surfaces 37 (Fig. 4) so as to cause the balls 36 to grip when the disks 32 are turned in one way or to roll or turn when the same are moved in the opposite direction. The disks 32 are surrounded by the peripheral flanges 39 of gear wheels 40, which latter are also mounted upon the shafts 33. There are a plurality of these eccentric arrangements 31, 32, etc., four however, being shown, as being a desirable number. The gear wheels 40 mesh with a gear 41 on the driven shaft 8. Thus the drum 14 when it is revolved by the driving shaft 7 and when said drum is eccentric to said shaft, will act upon the rings 29 and cause a movement of said rings, such movement being reciprocatory or vibratory, due to the fact that the ring 28 on the drum 8 strikes against the rings 29 and moves the latter sufficiently to permit the ring 28 to rotate, after which the ring 29 is free to return to its normal position, the sliding movement on the part of the rings 28 and 29 being accommodated by the ball bearings provided in connection with the rings 29 and disks 30 carrying the same. Springs 37 are provided to retract the disks 30, said springs 37 being conveniently extended between the several disks 30 and secured thereto by means of crank members 44 mounted upon pivots 45 on the disks 30. Thus it will be seen that by the rotation of the shaft 7 and the drum 14 thereon, said drum when in an eccentric position will impart vibratory movements to the disks 30 one after the other and these movements will be communicated by means of the disks 32 to the respective gear wheels 40 so as to impart impulses to the latter, such impulses for each wheel 40 being in the same direction. All of these wheels receiving impulses will be caused to rotate and this rotation will be communicated to the pinion 41 whereby said pinion will be given a continuous rotation. The speed of this rotation will depend of course upon the eccentricity of the drum 14, the speed of rotation of the pinion 41 being greater according as the eccentricity of said drum is increased. When said drum 14 is concentric with the shaft 7, the ring 28 rotates in contact with the rings 29, but does not move or swing the same out of position, whereby there is no movement on the part of the disks 32 nor any on the part of the gears 40, and consequently the driven shaft 8 is not rotated. The member 12 is provided with counterbalancing slides 12ª operated by racks 12ᵇ and 12ᶜ and a pinion 12ᵈ, as best shown in Figs. 3 and 5, so as to counterbalance the eccentricity of the drum 14.

For reversal, the gears 40 are provided with pinions 48 which mesh with the internal gear 49 carried by a disk 50, which latter is mounted upon a rotary sleeve 51 provided with ball bearing arrangements 52—53 between itself and the cylindrical prolongation 2. The sleeve 51 is keyed upon the shaft 8 whereby said shaft may be turned by the rotation of the gear 49. This rotation will obviously be reverse to the direction of rotation induced by the gears 40 and pinion 41, because the gear 49 transmits directly to the shaft 8, whereas the gear 40 transmits through the medium of the pinion 41. The ends of the shafts 33 are mounted upon an annular support 60 by which said shafts are supported and held in proper position.

The shaft 7 is provided with an extension 62 which extends into the driven shaft 8, the latter being tubular as well shown in Fig. 1. The end of the extension or rod 62 is provided with a head 63 held in position by a nut 64 and a coiled spring 65 is confined between the head 63 and a washer 66 in the bore of said shaft 8 near the shaft 7. This spring 65 tends by its expansion normally to move the shaft 8 to the left or in a direction toward the shaft 7, referring to Fig. 1. The movement of this shaft 8 is controlled by a lever 67 engaging a collar 68 on the shaft 8, whereby the swinging movement of said lever 67 may shift the shaft 8 longitudinally in one direction or the other. A rack 69 and catch lever 70 enable the operator to temporarily lock the lever 67 in any adjusted position. The shaft 8 is provided at its left hand end with teeth or projections 71 which may engage the keys 11 on the shaft 7, when either one or both of the shafts 7 and 8 are moved sufficiently toward one another to engage said members 11 and 71. Said shaft 8 is also provided with side projections or teeth 72 and the gear 41 with coöperating projections or teeth 73 whereby an interlocking or clutch engagement may be brought about between the teeth 72 and 73 by a longitudinal movement of the shaft 8, such as to cause the pinion 41 to drive said shaft 8 when the teeth 72 and 73 are in engagement and also such as to permit the pinion 41 to rotate freely without driving the shaft 8 when said teeth are out of engagement. The gear 50 is also provided with teeth 75 adapted to engage the teeth or projections 72 on the shaft 8 so as to permit a clutching engagement between said teeth 75 and 72, to permit the gear 50 to drive the shaft 8 when said teeth are engaged and also to permit the gear 50 to rotate freely without driving the shaft 8 when said teeth are not in engagement. This arrangement permits the driven shaft 8 to be engaged with either the pinion 41 or the gear 50; in the former case the shaft 8 will be driven forwardly and in the latter case it will be driven in a reverse direction. The arrangement also permits the direct engagement of the shafts 7 and 8 by means of the keys 11 and teeth 71 whereby there is a direct connection between said shafts and consequently what is called a "direct drive". By this arrangement it will be seen that assuming the shaft 7 to be at the left hand end of its thrust, the rollers 21 and 22 will be in the positions indicated at c, and the drum 14 will be concentric with the shaft 7. A movement of the shaft 7 to the right, (Figs. 1 and 6) will cause the rollers 21 and 22 to slide along the inclines 17 and 20 and thereby cause a shifting of the drum 14 to an eccentric position. Assuming of course that the shaft 7 is rotating this eccentricity on the part of the drum 14 will cause the actuation of the members 30 and 32 and the rotation of the gears 40 and through them the pinion 41. If the shaft 8 is in engagement with the pinion 41, the rotation of the latter will of course rotate the shaft 8. The extent to which the shaft 7 is shifted to the right will determine the speed of rotation of the shaft 8. When the shaft 7 is shifted sufficiently to the right to cause the rollers 21 and 22 to assume position b, (Fig. 6), the drum 41 will be shifted to its maximum eccentricity and the speed of the shaft 8 will be at a maximum. At this time the shaft 7 will have come into a position in which the keys 11 will approach closely to the teeth 71 and an adjustment of the shafts 7 and 8 will readily cause engagement between the members 11 and 71, thereby changing the drive of the shaft 7 from being transmitted by the drum 14 and coöperating eccentric mechanism, to a direct drive as between the shafts 7 and 8. This of course is the simplest possible arrangement and cuts out of operation all of the mechanism associated with the drum 14. This direct connection may be caused by a further right hand thrust of the shaft 7, such as to cause the wheels 21 and 22 to assume the position a (Fig. 6), in which case not only is the operation of the eccentric mechanism dispensed with, but at the same time the drum 14 is brought to a concentric position so that there is no operation of said mechanism. By reversing the direction of rotation of the shaft 8 the lever 67 is operated so as to bring the teeth 72 and 75 into engagement, thereby causing the rotation of the shaft 8 through the medium of the gear 50. A direct drive in the reverse direction is not of course necessary for the backward operation of an automobile or boat is not so prolonged or rapid as its forward operation.

In actual practice the lever 24 would preferably be under the control of a foot of the operator and the lever 67 under control of one of his hands. In order to put the transmission in condition for operation the lever 24 would be first operated by the foot so as to move the shaft 7 to its extreme left hand position (Figs. 1 and 6) in which the rollers 21 and 22 would be in position c of Fig. 6. This would be done more or less automatically by placing the foot of the operator upon the lever 24. The engine would then be started and the hand lever 67 would be operated by hand so as to move the shaft 8 into position to cause engagement between the clutch members 72 and 73. The foot would then be released at first a small amount so as to permit the spring 65 to draw the shaft 7 to the right, thereby bringing about an eccentricity of the drum 14 and starting the transmission in operation. The speed of operation would be controlled by the foot on the lever 24, releasing said lever more and more to permit the spring 65 to act more and more according as a higher and still higher speed was desired. When the foot was sufficiently released to permit the shaft 7 to move the keys 11 into engagement with the clutch members 71 a direct drive would be established and the gearing would be thrown out of operation by the return of the drum 14 to concentricity. To shut off the power the foot would be depressed upon the lever 24 so as to shift the shaft 7 to the left, thereby disconnecting the direct drive and throwing the gearing into operation at high speed and then gradually reducing the same until the shaft 7 resumed its left-handmost position and the drum 14 again assumed its concentric position. To effect a sudden or quick shutting off of power of course the hand lever 67 could be immediately operated, thereby disconnecting the clutch members 72 and 73 and causing a disconnection of the shaft 8 with the entire driving mechanism. In order to effect a reversal for backward movement of the vehicle, the hand lever 67 is shifted even farther to the right, thereby engaging the clutch members 72 and 75. This of course would be effected when the lever 24 was depressed to its lowermost position and the transmitting gear was not operating, although the drum 14 would be rotating. In the same way as before the foot would release the lever 24 little by little, so as to cause the gearing to actuate the shaft 8 and this operation would be increased to such speed as was desired by the further release of the lever 24 by the foot. Thus it will be seen that the entire range of speed from full stop to full speed and even direct drive may be effected by the single lever 24 or equivalent operating element. Also that a reverse may be accomplished by simply one additional lever or element 67, and the reverse speed may be changed or controlled as desired between no speed and high speed by the same operating element or foot lever 24.

In Fig. 1, the hand-lever 67 is shown in neutral position, in which position the auxiliary clutch-member 72 engages neither the clutch-member 73 of the forward-rotation gear 41 nor the clutch-member 75 of the rearward rotation gear 50, and the main clutch 11 of the driving-shaft 7 cannot engage the main clutch 71 of the driven-shaft 8, so that said shafts are not now in direct-coupled relation. The lever 67, by controlling the position of the driven shaft, controls the movement of the vehicle. By shifting the shaft 8 forwardly till the auxiliary clutch 72 engages the clutch 73, forward drive by the continuously variable speed transmission mechanism is established, and the shaft 8 is also in position for direct coupling. Direct drive is established when the foot-lever 24 is allowed to return to the limit of its rearward movement, and the eccentric is, in the final portion of this movement, brought to concentric position. The limit of rearward movement of the shaft 7 is reached when the eccentric returns to concentric position; and the shaft 8 may be set in neutral position or reverse-drive position by the hand-lever 67, in which action compression of the spring 65 occurs. Ordinarily, the engine will be started when the shaft 8 is in neutral position, and the foot-lever will be pressed forwardly the limit of its throw before the hand-lever is moved to throw the auxiliary clutch 72 into engagement with the clutch 73 of the forwardly-rotating gear 41. The foot-lever may then be allowed to return gradually to cause gradual acceleration of the vehicle and then quickly to establish direct coupling of the driving-shaft to the driven-shaft.

It will be understood that changes and modifications may be made without departing from the spirit of the invention.

What I claim is:

1. The combination of a driving shaft, an eccentric member mounted thereon, mechanism whereby said eccentric member may be shifted relatively to said driving shaft to vary its eccentricity, swinging members comprising disks 30 mounted eccentrically on shafts 33, said disks 30 being actuated so as to cause their swinging movement by said eccentric member, and ratchet mechanism actuated by the disks 30.

2. The combination of a driving shaft, an eccentric member mounted thereon, mechanism whereby said eccentric member may be shifted relatively to said driving shaft to vary its eccentricity, swinging members comprising disks 30 mounted eccentrically on shafts 33, said disks 30 being actuated so as to cause their swinging movement by said eccentric member, and ratchet mechanism actuated by the disks 30, said ratchet mechanism consisting of wheels 32 mounted on said shafts 33, and provided with peripheral recesses 35 having inclined surfaces 37, balls 36 in said recesses 35, and driven gears 40 having recesses in which the wheels 32 are located and having rims 39 with which the balls 36 coöperate and engage, and a driven pinion meshing with said gears 40.

3. The combination of a driving shaft, an eccentric member mounted thereon, mechanism whereby said eccentric member may be shifted relatively to said driving shaft to vary its eccentricity, swinging members comprising disks 30 mounted eccentrically on shafts 33, said disks 30 being actuated so as to cause their swinging movement by said eccentric member, and ratchet mechanism actuated by the disks 30, said ratchet mechanism consisting of wheels 32 mounted on said shafts 33, and provided with peripheral recesses 35 having inclined surfaces 37, balls 36 in said recesses 35, and driven gears 40 having recesses in which the wheels 32 are located and having rims 39 in which the balls 36 coöperate and engage, and a driven pinion meshing with said gears 40, said disks 30 being provided with rings 29 and balls between said rings 29 and the peripheries of said disks 30, said eccentric member acting upon said rings 29.

4. The combination of a driving shaft, an eccentric member mounted thereon, power transmitting mechanism actuated by said eccentric member, a rotary driven shaft actuated by said power transmitting mechanism, means whereby said eccentric member may be adjusted so as to cause the rotation of the driven shaft at a speed substantially the same as that of the driving shaft, and means whereby the driving shaft may be connected directly to the driven shaft when the latter has attained such speed.

5. The combination of a longitudinally adjustable driving shaft, an adjustable eccentric mounted thereon and driven through the medium thereof, power transmitting mechanism actuated by said eccentric, and a driven shaft actuated by said power transmitting mechanism, said driving shaft being longitudinally adjustable and provided with means whereby its longitudinal adjustment will adjust said eccentric so as to cause the driven shaft to be driven at substantially the same speed as the driving shaft.

6. The combination of a driving shaft, an adjustable eccentric mounted thereon, power transmitting mechanism actuated by said eccentric, a driven shaft actuated by said power transmitting mechanism, said driving shaft being longitudinally adjustable and provided with means whereby its longitudinal adjustment will adjust said eccentric so as to cause the driven shaft to be driven at substantially the same speed as the driving shaft, and means whereby said driving shaft may be directly connected with the driven shaft when the latter is driven at such speed.

7. The combination of a driving shaft, an adjustable eccentric mounted thereon, power transmitting mechanism actuated by said eccentric, a driven shaft actuated by said power transmitting mechanism, said driving shaft being longitudinally adjustable and provided with means whereby its longitudinal adjustment will adjust said eccentric so as to cause the driven shaft to be driven at substantially the same speed as the driving shaft, and means whereby said driving shaft may be directly connected with the driven shaft when the latter is driven by said transmitting mechanism at said speed, said last mentioned mechanism comprising means on the driving and driven shafts for engaging the ends of the same with one another.

8. The combination of a longitudinally adjustable rotary driving shaft, an eccentric member mounted thereon, means whereby the longitudinal adjustment of said shaft will vary the eccentricity of said eccentric member, power transmitting mechanism actuated by said eccentric member, a longitudinally adjustable driven shaft, and means whereby the longitudinal adjustment of said driven shaft may cause the engagement of the same with the power transmitting connection so as to drive said shaft in either a forward or reverse direction.

9. The combination of a longitudinally adjustable rotary driving shaft, an eccentric member mounted thereon, means whereby the longitudinal adjustment of said shaft will vary the eccentricity of said eccentric member, power transmitting mechanism actuated by said eccentric member, a longitudinally adjustable driven shaft, and means whereby the longitudinal adjustment of said driven shaft may cause the engagement of the same with the power transmitting connection so as to drive said shaft in either a forward or reverse direction, and also whereby said driving and driven shafts may be connected together for direct driving action by a relative longitudinal movement of said shafts.

10. In a transmission mechanism, a casing, a driving shaft mounted therein, an adjustable eccentric mounted upon said driving shaft, a stub shaft, a plurality of gears mounted thereon, intermittent operating mechanism connecting said eccentric and one of said gears, a driven shaft, a driven gear thereon meshing with said intermittently operated gear, a supplemental gear, a clutch member on said driven shaft and means to shift said driven shaft to engage said clutch member with either the driven gear or said supplemental gear.

11. The combination with a driving shaft of an eccentric carried thereby, said shaft and eccentric being provided with means whereby a relative adjustment of said driving shaft and eccentric will cause a transverse shifting movement on the part of the eccentric, swinging members actuated by said eccentric, rotary members provided with ratchet mechanism forming a power transmitting connection, and a driven shaft driven by said rotary members, said driven shaft being longitudinally adjustable and provided with means for throwing it into and out of operative relation with said rotary members.

12. The combination with a driving shaft of an eccentric carried thereby, said shaft and eccentric being provided with means whereby a relative adjustment of said driving shaft and eccentric will cause a transverse shifting movement on the part of the eccentric, swinging members actuated by said eccentric, rotary members provided with ratchet mechanism forming a power transmitting connection, a driven shaft driven by said rotary members, said driven shaft being longitudinally adjustable and provided with means for throwing it into and out of operative relation with said rotary members, and a manually operated actuating device for controlling said driven shaft.

13. The combination of an eccentric member and a stub shaft provided with a plurality of gears and also provided with an eccentric, said eccentric member being adapted to actuate the eccentric member on said stub shaft, a driven shaft, and means adapted to be actuated by said gears and to actuate said driven shaft in either direction.

14. The combination of a driving shaft and eccentric device mounted upon said driving shaft, said driving shaft being longitudinally adjustable and said shaft and said eccentric being provided with means whereby a longitudinal adjustment of the shaft causes a variation in the eccentricity of said eccentric, power transmitting mechanism actuated by said eccentric and adapted to vary the transmitted speed in accordance with variations in the eccentricity of said eccentric, and a driven shaft arranged to be operated by said power transmitting mechanism, said driven shaft and power transmitting mechanism being provided with engaging and disengaging means to permit engagement and disengagement of the same.

15. The combination of a driving shaft equipped with an eccentric member, a plurality of stub shafts each provided with an eccentric adapted to be actuated by said first-named eccentric member, and each also provided with a plurality of gears, ratchet mechanisms actuated by said second-named eccentrics, a driven shaft, and means for transmitting motion in either direction from said gears to said driven shaft.

16. The combination of a driving shaft and eccentric device mounted upon said driving shaft, said driving shaft being longitudinally adjustable and said shaft and said eccentric being provided with means whereby a longitudinal adjustment of the shaft causes a variation in the eccentricity of said eccentric, power transmitting mechanism actuated by said eccentric and adapted to vary the transmitted speed in accordance with variations in the eccentricity of said eccentric, and a driven shaft arranged to be operated by said power transmitting mechanism, said power transmitting mechanism being adapted to drive said driven shaft in either a forward or reverse direction, said driven shaft being longitudinally adjustable and provided with means whereby it may be engaged with said power transmitting mechanism to cause its operation in one direction or the other.

17. The combination of a rotary driving member, variable-throw power transmitting mechanism actuated by the same, a rotary driven member, said driving member being longitudinally adjustable, and means whereby the longitudinal adjustment of said driving member will cause the driven member to be actuated either directly by the driving member or indirectly through the transmitting mechanism.

18. The combination of a longitudinally adjustable driving shaft, of power transmitting mechanism and mechanism coöperating therewith whereby the longitudinal adjustment of said driving shaft will change the speed of transmission of said mechanism, a driven shaft, and means whereby said driven shaft may be connected and disconnected with said power transmitting mechanism.

19. The combination of a longitudinally adjustable driving shaft, of power transmitting mechanism and mechanism coöperating therewith whereby the longitudinal adjustment of said driving shaft will change the speed of transmission of said mechanism, a longitudinally adjustable driven shaft, and means whereby the adjustment of said driven shaft may connect and disconnect the same with said power transmitting mechanism.

20. The combination of a rotary driving member, power transmitting mechanism actuated by the same, a rotary driven member, said driving member being longitudinally adjustable, and means whereby the longitudinal adjustment of said driving member will cause the driven member to be actuated either directly by the driving member or indirectly through the transmitting mechanism, said driven member being also longitudinally adjustable and means whereby the longitudinal adjustment of said driven member will cause the same to be driven in a forward or reverse direction.

21. The combination of a longitudinally adjustable driving shaft, of power transmitting mechanism, and mechanism coöperating therewith whereby the longitudinal adjustment of said driving shaft will change the speed of transmission of said mechanism, said power transmitting mechanism being adapted to transmit power in a forward or reverse manner, a driven shaft, and means whereby said driven shaft may be connected with said power transmitting mechanism to effect the driving of said driven shaft in either a forward or reverse direction.

22. The combination of a longitudinally adjustable driving shaft, of power transmitting mechanism, and mechanism coöperating therewith whereby the longitudinal adjustment of said driving shaft will change the speed of transmission of said mechanism, said power transmitting mechanism being adapted to transmit power in a forward or reverse manner, a longitudinally adjustable driven shaft, and means whereby by its longitudinal adjustment said driven shaft may be connected with said power transmitting mechanism so as to be driven in either a forward or reverse manner.

23. The combination of a longitudinally adjustable driving shaft, a longitudinally adjustable driven shaft, power transmitting mechanism between the driving and driven shafts, mechanism coöperating therewith whereby the longitudinal adjustment of the driving shaft changes the speed of said mechanism, and means whereby the longitudinal adjustment of the driven shaft connects said shaft with said mechanism or disconnects the same therefrom.

24. The combination of a longitudinally adjustable driving shaft and a longitudinally adjustable driven shaft, of means whereby the driven shaft may be driven in either direction, said driven shaft being provided with mechanism coöperating therewith whereby its longitudinal adjustment determines the direction in which it is driven.

25. The combination of a longitudinally adjustable driving shaft and a longitudinally adjustable driven shaft, of means whereby the driven shaft may be driven in either direction, said driven shaft being provided with mechanism coöperating therewith whereby its longitudinal adjustment determines the direction in which it is driven, and also permits it to remain stationary while the driving shaft means driven thereby are in operation.

26. The combination of an eccentric member, counterbalancing slides, and mechanism coöperating therewith whereby said slides are automatically adjusted to counterbalance said eccentric as its eccentricity is varied.

27. The combination of a rotary shaft, an eccentric thereon provided with means for varying its eccentricity on said shaft, slides mounted adjacent to said eccentric, said slides and eccentric being provided with racks and pinions interposed between said racks so as to shift said slides when said eccentric is shifted and in a direction opposite to the movement of the eccentric.

28. The combination with the rotary driving shaft and transversely shiftable eccentric mounted thereon, of swinging members consisting of eccentrically mounted disks provided with annular rims having ball bearing mountings, said rims being adapted to coöperate with said eccentric, and driven mechanism operated by said swinging members.

29. The combination with the rotary driving shaft and transversely shiftable eccentric mounted thereon, of swinging members consisting of eccentrically mounted disks provided with annular rims having ball bearing mountings, said rims being adapted to coöperate with said eccentric, and spring means connecting said disks and arranged to return the same after actuation of said eccentric, and driven mechanism operated by said swinging members.

30. The combination with the rotary driving shaft and transversely shiftable eccentric mounted thereon, of swinging members consisting of eccentrically mounted disks provided with annular rims having ball bearing mountings, said rims being adapted to coöperate with said eccentric, and spring means connecting said disks and arranged to return the same after actuation of said eccentric, and gears provided with recesses containing disks having ratchet connections with said gears, said disks carrying the eccentrics on said first mentioned disks, and driven mechanism operated by said swinging members.

31. The combination of a longitudinally movable driving shaft, a spring tending to shift said shaft rearwardly, a foot-lever adapted to oppose the action of said spring and control the position of said driving shaft, variable throw transmission mechanism, including an eccentric member mounted on and rotated through the medium of said driving shaft and eccentrically adjusted in the longitudinal movement of said driving shaft, and a driven shaft actuated by said transmission mechanism.

32. The combination of a longitudinally movable driving shaft, a spring tending to shift said shaft rearwardly, a foot-lever adapted to oppose said spring and control the position of said shaft, variable throw transmission mechanism, including an eccentric member adapted to be eccentrically adjusted in the longitudinal movement of said shaft, a driven shaft, and means whereby said driven shaft may be actuated in either direction by said transmission mechanism.

33. The combination of a longitudinally movable driving shaft, a foot-lever controlling the position thereof, variable throw transmission mechanism including an eccentric member mounted on and rotated through the medium of said driving shaft and eccentrically adjusted in the longitudinal movement of said driving shaft, said transmission mechanism being provided with forward and reverse gears driven by said eccentric member, a driven shaft, and means for connecting the driven shaft for actuation either by the forward or the reverse gear, or causing said driven shaft to remain inactive, at will.

34. The combination of normally spring-held direct-coupled driving and driven shafts, variable throw transmission mechanism between them provided with forward and reverse gears, means for shifting said shafts relative to each other, means dependent on the position of the driving shaft for varying the throw of said transmission mechanism, and means dependent upon the position of the driven shaft for determining the direction of rotation thereof.

35. The combination of a longitudinally shiftable driving shaft, variable throw transmission mechanism, including an eccentric device adjustable by said driving shaft, a longitudinally adjustable driven shaft, forward and reverse gears journaled on said driven shaft and actuated by said transmission mechanism, and means on said driven shaft for coupling it to either the forward or the reverse gear.

36. The combination of a tubular driven shaft, manual positioning means therefor, a driving shaft extending into said driven shaft, said shafts being equipped with co-acting clutch-members, a spring in said driven shaft tending to draw said shafts together into direct-coupled relation, transmission mechanism between said shafts provided with means for effecting rotation of the driven shaft in either direction and including a variable throw device mounted on, actuated by and adjusted through the medium of said driving shaft, a foot-lever controlling the adjustment of said driving shaft, and means for connecting the driven shaft to the transmission mechanism for rotation in either direction.

37. The combination of a foot-controlled driving shaft equipped with a coupling member, an alined driven shaft equipped with a companion coupling member, means tending to force said shafts into direct-coupled relation, variable throw transmission mechanism between said shafts provided with means for actuating the driven shaft in forward and reverse directions, and vehicle-controlling means adapted to control the movement of the driven shaft.

38. The combination of a foot-controlled driving shaft equipped with a coupling member, an alined driven shaft equipped with a companion coupling member, means tending to force said shafts into direct-coupled relation, variable throw transmission mechanism between said shafts provided with means for actuating the driven shaft in forward and reverse directions, means fixedly carried by the driving shaft for clutching it to said transmission mechanism for either forward or reverse drive, and means for setting said driven shaft in position for any selected actuation.

39. The combination with a driven shaft equipped with a coupling-member, and means for setting said shaft in positions corresponding with forward, neutral and reverse controls, of a driving shaft equipped with a coupling-member for direct-drive, and transmission mechanism between said shafts provided with means for actuating the driven shaft in forward or reverse direction, depending upon the position of the driven shaft, said transmission mechanism including a variable throw actuating device actuated by said driving shaft.

40. The combination with a driven shaft equipped with a coupling member, and means for setting said shaft in positions corresponding with forward, neutral and reverse controls, of a driving shaft equipped with a coupling member for direct drive, and transmission mechanism between said shafts provided with means for actuating the driven shaft in forward or reverse direction, depending upon the position of the driven shaft, said transmission mechanism including an eccentric device adjustable through the medium of and actuated by said driving shaft.

41. The combination with a foot-controlled eccentric and a driving shaft serving to rotate said eccentric, of a driven shaft, transmission mechanism between said shafts and actuated by said eccentric and provided with means for effecting either forward or reverse transmission, means for coupling the driven shaft to cause either forward or reverse rotation thereof, means for effecting direct-coupling between the driving and driven shafts, said means being coördinated with said foot-controlled eccentric, and manual vehicle-controlling means controlling the direct-coupling of said shafts and controlling also the direction of rotation of said driven shaft when actuated by said transmission mechanism.

42. The combination of a driving shaft and driven shaft in alined relation, a spring tending to draw said shafts together, a lever controlling the position of the driving shaft, a lever controlling the position of the driven shaft, and transmission means between said shafts, including eccentric mechanism actuated by said driving shaft.

43. The combination of a driving shaft and driven shaft in alined relation, a spring tending to draw said shafts together, a lever controlling the position of the driving shaft, a lever controlling the position of the driven shaft, and transmission means between the said shafts, including eccentric mechanism controlled in eccentricity and actuated by said driving shaft.

44. The combination of a longitudinally movable driving shaft, a spring tending to shift said shaft in one direction, a foot-lever adapted to oppose the shifting of said shaft by the action of the spring, and to control the position of said shaft, an eccentric mounted on said shaft, connections between said shaft and eccentric for shifting the eccentric from concentric position to extreme eccentric position and back to concentric position while said shaft is moving from one end of its traverse to the other end thereof, a driven shaft, and mechanism for transmitting power from said eccentric to said driven shaft.

45. The combination of a longitudinally movable driving shaft, a spring tending to shift said shaft in one direction, a foot-lever controlling the movement of said shaft, a driven shaft, transmission mechanism between said shafts provided with means for actuating the driven shaft in either direction and including an eccentric mounted on and actuated by the driving shaft, and connections between the driving shaft and eccentric for shifting the eccentric from concentric position to extreme eccentric position and back to concentric position while said driving shaft is moving from one end of its traverse to the other.

46. The combination of a longitudinally movable shaft, a spring tending to shift said shaft rearwardly, a foot-lever controlling the position of said shaft, a longitudinally immovable tubular shaft encircling said first-named shaft, a driven shaft, transmission mechanism between said tubular shaft and said driven shaft, including a variable throw actuating member mounted for adjustment transversely on said tubular shaft, and means actuated by said first-named shaft in the longitudinal adjustment thereof for varying the throw of said variable throw actuating member.

47. The combination of a longitudinally movable driving shaft, a lever for shifting the same, an eccentric mounted on said shaft, connections between said shaft and eccentric for shifting the eccentric from concentric position to extreme eccentric position and back to concentric position while said shaft is moving from one end of its traverse to the other end thereof, a driven shaft, coupling members at the adjacent ends of said shafts, a spring tending to draw said shafts into direct-coupled relation, mechanism for transmitting power from said eccentric to said driven shaft, and means for connecting said mechanism to and disconnecting it from said driven shaft.

48. The combination of a casing, a longitudinally immovable tubular shaft journaled in one end of said casing, a longitudinally movable tubular driven shaft journaled in the other end of said casing, a driving shaft extending through said first-named tubular shaft and into said driven shaft, spring connections between said shafts tending to draw them into direct-coupled relation, variable throw transmission mechanism between said shafts, including a variable throw actuating element mounted on said first-named tubular shaft, means for causing said actuating element to be shifted in the shifting movement of said driving shaft and for causing said first-named tubular shaft to rotate with said driving shaft, a lever serving to regulate the position of said driving shaft, a lever serving to regulate the position of said driven shaft, and means for coupling the driven shaft to said variable throw transmission mechanism.

49. The combination of a driving shaft, gradually variable transmission mechanism having a variable-throw actuating member mounted on said driving shaft, means associated with the driving shaft for varying the eccentricity of said actuating member, a driven shaft, and means correlated with the eccentricity-varying means whereby said driven shaft may be coupled to rotate directly with said driving shaft, or may be actuated through the medium of said transmission mechanism.

50. The combination of a tubular shaft, a variable throw actuating member mounted thereon, a spring-retracted, longitudinally shiftable shaft serving to adjust said actuating member and which is provided with a main-clutch member, a lever controlling the position of said second-named shaft, a driven shaft provided with a main clutch-device and an auxiliary clutch-device which are movable as a unit, means for shifting said clutch-devices, and transmission mechanism actuated by said variable-throw actuating member and having a gear co-axial with said driven shaft and equipped with an auxiliary clutch-member.

51. The combination of a tubular shaft, a variable-throw actuating member mounted thereon, a spring-retracted, longitudinally shiftable shaft serving to adjust said actuating member and which is provided with a main-clutch member, a lever controlling the position of said second-named shaft, a driven shaft provided with a main clutch-device and an auxiliary clutch-device which are movable as a unit, means for shifting said clutch devices, transmission mechanism actuated by said variable-throw actuating member and having a gear co-axial with said driven shaft and equipped with an auxiliary clutch member, and a spring tending to effect direct-coupling of said driving shaft and said driven shaft.

52. Mechanism comprising direct-coupled driving and driven shafts adapted to rotate as a unit, gradually variable transmission mechanism between said shafts comprising a variable-throw actuating member mounted on and actuated by said driving shaft and a countershaft equipped with means whereby it may be actuated by said variable-throw member, and means for disconnecting the driven shaft from the driving shaft and connecting it to said transmission mechanism, said mechanism being constructed and arranged to permit said counter-shaft to remain idle when the driven shaft is coupled directly to the driving shaft.

53. The combination of a driving-shaft, variable speed transmission mechanism comprising an eccentric mounted on the driving-shaft and a plurality of counter-shafts actuated by said eccentric, a longitudinally movable driven shaft provided with means for direct connection with the driving-shaft, and means for actuating the driven shaft in either direction through the medium of said counter-shafts, the actuation of the driven shaft by direct-connection and through the medium of said transmission mechanism being dependent upon the position of the driven shaft.

54. The combination of a driving shaft having a longitudinally movable member, a spring tending to shift said member rearwardly, a foot-lever adapted to control the position of said member, an eccentric mounted on the driving shaft, connections between said longitudinally movable member and eccentric for shifting the eccentric from concentric position to extreme eccentric position and back to concentric position while said longitudinally movable member is moving from one end of its traverse to the other end thereof, a driven shaft in alinement with said longitudinally shiftable member, mechanism for transmitting power from said eccentric to said driven shaft, and means for coupling said longitudinally shiftable member to the driven shaft and thereby establishing direct drive when said longitudinally shiftable member is in the retracted position.

In witness whereof, I hereunto subscribe my name this 10th day of June, A. D. 1916.

JOSEPH DE MARTINO.

Witnesses:
  A. L. JONES,
  HAZEL A. JONES.